US010656067B2

(12) United States Patent
Haberger et al.

(10) Patent No.: US 10,656,067 B2
(45) Date of Patent: May 19, 2020

(54) MEASURING ARRANGEMENT AND METHOD OF DIRECTING AND DETECTING PARTICLES

(71) Applicant: Fraunhofer-Gesellschaft zur Foerderung der angewandten Forschung e.V., Munich (DE)

(72) Inventors: Karl Haberger, Martinsried (DE); Katrin Moebius, Germering (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 274 days.

(21) Appl. No.: 15/679,688

(22) Filed: Aug. 17, 2017

(65) Prior Publication Data

US 2018/0052089 A1    Feb. 22, 2018

(30) Foreign Application Priority Data

Aug. 17, 2016 (DE) ........................ 10 2016 215 419

(51) Int. Cl.
| G01N 15/02 | (2006.01) |
| G01N 15/06 | (2006.01) |
| G01B 7/14 | (2006.01) |
| G01D 5/241 | (2006.01) |
| G01N 27/61 | (2006.01) |
| G01P 5/00 | (2006.01) |
| G01N 15/00 | (2006.01) |
| G01N 1/22 | (2006.01) |

(52) U.S. Cl.
CPC .......... *G01N 15/0266* (2013.01); *G01B 7/14* (2013.01); *G01D 5/2415* (2013.01); *G01D 5/2417* (2013.01); *G01N 15/0612* (2013.01); *G01N 27/61* (2013.01); *G01P 5/006* (2013.01); *G01N 1/2202* (2013.01); *G01N 2015/0046* (2013.01)

(58) Field of Classification Search
CPC .............. G01N 15/02; G01N 15/0205; G01N 15/0211; G01N 15/0266; G01N 15/0606; G01N 15/0612; G01N 15/0656
See application file for complete search history.

(56) References Cited

U.S. PATENT DOCUMENTS

| 8,450,215 B2 | 5/2013 | Mantz et al. | |
| 2009/0014646 A1 | 1/2009 | Vakhshoori et al. | |
| 2012/0154348 A1* | 6/2012 | Okuno ..................... | C12Q 1/06 345/204 |
| 2013/0192341 A1 | 8/2013 | Ajay et al. | |
| 2013/0192462 A1 | 8/2013 | Pant et al. | |
| 2014/0308456 A1* | 10/2014 | Guan ........................ | B05B 5/00 427/475 |
| 2016/0041094 A1* | 2/2016 | Lei ..................... | G01N 15/1436 250/573 |
| 2018/0080760 A1* | 3/2018 | Allier ................. | G01N 15/1429 |

FOREIGN PATENT DOCUMENTS

| DE | 10 2009 036 701 A1 | 3/2011 |
| DE | 10 2014 226 332 A1 | 6/2016 |

* cited by examiner

*Primary Examiner* — Erika J Villaluna
(74) *Attorney, Agent, or Firm* — Dicke, Billig & Czaja, PLLC

(57) ABSTRACT

A measuring arrangement includes an electrostatic concentrator, a surface and an imaging sensor which are configured to detect particles.

25 Claims, 9 Drawing Sheets

MEASURING ARRANGEMENT AND METHOD OF DIRECTING AND DETECTING PARTICLES

CROSS-REFERENCE TO RELATED APPLICATIONS

This application claims priority from German Patent Application No. 10 2016 215 419.2, which was filed on Aug. 17, 2016, and is incorporated herein in its entirety by reference.

An embodiment in accordance with the present invention relates to a measuring arrangement which directs particles to be verified toward a surface by means of an electrostatic concentrator and detects the particles directed toward the surface by means of an imaging sensor. An embodiment in accordance with the present invention relates to a method of detecting particles.

Further embodiments in accordance with the invention describe a miniaturized measuring arrangement for qualitative measurement of fine dust (particulate matter) in flowing gases.

BACKGROUND OF THE INVENTION

Up to now, there have existed various concepts of measuring and analyzing particles within fluids, e.g. concentrations of fine dust in gases. However, previous devices and methods of measuring and analyzing particles within fluids have involved spatially highly extended measuring arrangements.

Against this background, there is a need for a concept enabling particularly good sensing of particles within a fluid.

SUMMARY

According to an embodiment, a measuring arrangement may have: an electrostatic concentrator configured to direct particles to be verified toward a surface; an imaging sensor configured to detect the particles directed onto the surface; the electrostatic concentrator including a field electrode which is arranged in the surface or on the surface or adjacently to the surface and is configured to generate an inhomogeneous electrostatic field so as to direct the particles to be verified toward the surface.

According to another embodiment, a method of detecting particles may have the steps of: directing particles to be verified toward a surface on the part of an electrostatic concentrator; detecting the particles directed onto the surface on the part of an imaging sensor; the electrostatic concentrator including a field electrode which is arranged in the surface or on the surface or adjacently to the surface, and generates an inhomogeneous electrostatic field so as to direct the particles to be verified toward the surface.

An embodiment in accordance with the invention provides a measuring arrangement having an electrostatic concentrator and an imaging sensor. The electrostatic concentrator is configured to direct particles toward a surface. The particles directed toward the surface by the electrostatic concentrator are detected by an imaging sensor.

This embodiment in accordance with the invention is based on the finding that particles within an electric field undergo charge separation, which leads to a polarization of the particles, which may be used for directing said particles, in accordance with an electric field. In addition, a spatially adjacent arrangement of an electrostatic static concentrator and an imagining sensor enables advantageous utilization of space for directing and detecting particles. Moreover, optimization with regard to utilization of space may be achieved by designing the electrostatic concentrator and the imaging sensor in an integrated manner. In addition, a suitable arrangement, for example, may result in that the particles are directed toward an area where optical sensing may be performed particularly well, for example with a particularly high level of resolution or sharpness, by the imagining sensor.

For example, the electrostatic concentrator may comprise a field electrode which is arranged in the surface or on the surface or adjacently to the surface and which is configured to generate an inhomogeneous electrostatic field so as to direct the particles to be verified toward the surface. Arranging the field electrode as described above is advantageous, for example, in terms of enabling low-cost manufacturing and a space-saving overall setup of the measuring arrangement.

In an advantageous embodiment, the surface and the electrostatic concentrator are configured such that temporary adhesion of the particles to the surface enables sensing of the adhered particles by the imaging sensor. Because of said temporary adhesion of the particles, cheaper imaging may be used, for example, since particles may be static for detection purposes.

In a further advantageous embodiment, the surface toward which the particles are directed forms part of the imaging sensor or is arranged immediately adjacently to the imagining sensor. Here, a field electrode is arranged, in a direction of incident light, in front of the imaging sensor or on a surface of the imaging sensor so as to generate an inhomogeneous electric field for deflecting the particles to be verified and to direct the particles to be verified in a direction toward the imaging sensor. Arranging the surface and the imaging sensor adjacently to each other enables improved utilization of space of the measuring arrangement while offering the possibility of implementation as an integrated component.

In an advantageous embodiment, a field electrode of the electrostatic concentrator is configured to have at least one electrode strip, a width of the at least one electrode strip being smaller than the largest extension of a photosensitive individual cell of the imaging sensor. Implementing the field electrode with at least one electrode strip, a width of the at least one electrode strip being smaller than the largest extension of a photosensitive individual cell of the imaging sensor, is advantageous with regard to imaging if the field electrode is arranged in the direction of incident light of the imaging sensor. If the field electrode is arranged in the direction of incident light, complete covering of the photosensitive individual cell of the imaging sensor may be avoided, and the electrode strip may be arranged, e.g., between rows or columns of the imaging sensor when viewed in the direction of incident light.

In an advantageous embodiment, a field electrode of the electrostatic concentrator comprises a transparent electrode material. Utilization of transparent electrode material is favorable in if the field electrode of the electrostatic concentrator is arranged in the direction of incident light of the imaging sensor. In this manner, covering of a photosensitive area, e.g., of a photosensitive individual cell of the imaging sensor, can be completely avoided.

In an advantageous embodiment of the measuring arrangement, the surface toward which the particles are directed is separated from the imaging sensor by one or more transparent layers. Here, the measuring arrangement comprises a shielding electrode arranged between a field electrode and the imaging electronics (e.g. a p-n junction of a photodiode, a read amplifier, a charge storage or the like) of the imaging sensor and which is configured to at least partially shield off an electric field of the electrostatic concentrator from the imaging electronics of the imaging sensor, or to fully shield it off, at any rate to shield it off to such an extent that no harm is caused. By implementing the electrostatic concentrator and the imaging sensor adjacently to each other, the possibility of an electric punch-through (breakdown) from the field electrode to the imaging electronics exists in the event of there being a high field strength, triggered by the potential of the field electrode. Said breakdown may be potentially harmful for the measuring arrangement, which is why an arrangement such as described above may be provided with a shielding electrode that is useful in terms of protecting the imaging electronics of the imagining sensor.

In a further advantageous embodiment, a counter electrode is arranged at a distance from the field electrode, so that an inhomogeneous electric field directing particles toward the surface may be generated within a flow channel extending between the counter electrode and the surface. By arranging the counter electrode, generation of an inhomogeneous electric field is made easier. In addition, said arrangement is advantageous so as to define, e.g. by means of the counter electrode, a channel through which a fluid may flow.

In a further advantageous embodiment, the surface is arranged, in a direction of incident light, adjacently to an imaging sensor. Moreover, the measuring arrangement is configured to detect cast shadows or a shadow image (proximity imaging) of particles directed toward the surface or of particles adhering to the surface. The embodiment described enables particularly space-saving integration and, thus, low-cost manufacturing.

In a further advantageous embodiment, the surface is arranged, in a direction of incident light, adjacently to an imaging sensor. Moreover, the measuring arrangement is configured to image the particles directed toward the surface or the surface provided with particles adhering to it onto the imaging sensor by means of cast shadows (proximity imaging). The embodiment described enables particularly space-saving integration and, thus, low-cost manufacturing.

In a further advantageous embodiment, the surface is arranged at a distance from an imaging sensor; an optical system comprising refractive optics or mirror optics is arranged between the surface and the imaging sensor so as to image the particles directed toward the surface or the surface provided with particles adhering to it onto the imaging sensor. Such an arrangement may be advantageous so as to enable, e.g., magnification of the particles by means of conventional imaging optics, whereby qualitative detection of the particles may be rendered easier.

In a further advantageous embodiment, the measuring arrangement is configured to generate a field strength of at least 30 kV/m in the surroundings of a field electrode of the electrostatic concentrator. Such a field strength is advantageous for generating an intensely inhomogeneous field, with the highest field line density being at the field electrode, whereby sufficient polarization of the particles and direction thereof may be performed.

An advantageous embodiment comprises several detection areas, a second detection area being configured to detect particles having covered a distance, through an electrostatic field generated by the electrostatic concentrator, that is larger than that covered by particles detected through a first one of the detection areas. Such an arrangement is advantageous for separating particles of different sizes since large particles can be subject to more intense polarization. Said more intense polarization results in a larger electric dipole moment, which results in that within an electric field, large particles have larger forces acting on them than small particles. Thus, the forces may be used advantageously in order to distinguish particles of different sizes by means of the different distances covered by them.

In an advantageous embodiment, the first detection area has a first electrode of the electrostatic concentrator associated with it which is configured to direct particles toward the first detection area. The second detection area has a second electrode of the electrostatic concentrator associated with it, for example in parallel with the surface of the first detection area, which is configured to direct particles toward the second detection area. The extension of the second electrode in a main direction of flow (e.g. a central direction of flow and/or a direction along a center line of a flow channel) of the particles is larger than an extension of the first electrode in the main direction of flow of the particles. Such an arrangement may be advantageous for roughly distinguishing according to the size of the particles, on the basis of the finding that large particles cover shorter distances in the electric field, due to a higher induced dipole moment, so as to be able to reach the surface and/or to come sufficiently close to the surface.

In an advantageous embodiment, the measuring arrangement is configured to temporarily switch off the field of the electrostatic concentrator so as to enable detachment of the particles from the surface. Such a design of the measuring arrangement is advantageous in terms of enabling the surface to be cleaned from adhering particles. If the surface is arranged, e.g., in parallel with the main direction of flow of the gas, effective cleaning of the surface may thus be performed.

In an advantageous embodiment, the measuring arrangement comprises a micromechanical element configured to enable detachment of particles adhering to the surface. Said micromechanical element, e.g. a piezo film, may cause the surface to vibrate at a high frequency, for example by means of ultrasound. The high-frequency vibrations by themselves or in combination with the flow of the fluid are suitable for cleaning the surface.

In an advantageous embodiment, the measuring arrangement is configured to temporarily generate an inhomogeneous electrostatic field whose the field strength increases starting from the surface and which is configured to move particles away from the surface. Here, a combination with arranging the surface essentially tangentially to the main direction of flow of the gas is advantageous since in this manner, adhering particles may be efficiently transported off once electrostatic detachment has occurred.

In an advantageous embodiment, the measuring arrangement is configured to apply image recognition to the signal of the imaging sensor for qualitative and quantitative determination of particles. The information obtained in this process may advantageously be used for informing a user, e.g., in the event of detecting particles that are potentially harmful, e.g. allergens or fine dust (particulate matter).

In an advantageous embodiment, the measuring arrangement is configured on the basis of the signal of the imaging sensor by means of a database. A measuring arrangement thus configured can efficiently identify particles of interest by means of database entries of known particles.

In an advantageous embodiment, the measuring arrangement is configured to classify particles on the basis of the signal of the imaging sensor by means of their shapes. Such an implementation of the classification is advantageous, e.g., for an arrangement wherein the signal of the imaging sensor describes a shadow image created by a particle. This is the case, e.g., when the surface toward which the particles are directed is arranged in a direction of incident light of the imaging sensor.

In an advantageous embodiment, the measuring arrangement is configured to classify particles on the basis of the signal of the imaging sensor by means of their diffraction patterns or scattering patterns. Such a design of the measuring arrangement is advantageous in terms of recognizing particles whose dimensions or images are comparable to or smaller than the dimension of a pixel, even after having been magnified by an optical system such as mirror optics or refractive optics, or whose dimensions are even in an order of magnitude of a wavelength of light, and to at least roughly classify them according to their respective sizes.

In an advantageous embodiment, the measuring arrangement is configured to take into account, when classifying the particles, a wavelength dependence of image information sensed by the imaging sensor. A measuring arrangement thus configured may advantageously make use of wavelength-dependent effects in order to classify particles whose dimensions and/or images are comparable to or smaller than that of a pixel, even after having been magnified by an optical system such as mirror optics or refractive optics.

In an advantageous embodiment, an air flow meter and/or fluid flow meter is arranged to sense the speed of a gas flow and/or fluid flow which passes the surface of the electrostatic concentrator. Speed information obtained by means of the air flow meter and/or fluid flow meter may be advantageously used for quantitative and qualitative measurement of particles.

In a further advantageous embodiment, the above-mentioned air flow meter is arranged on a surface along with a field electrode of the electrostatic concentrator. Arranging the air flow meter in this manner is advantageous for miniaturization: the obvious thing to do would be to perform low-cost implementation in the form of an integrated component.

In a further advantageous embodiment, the measuring arrangement includes a filter, said filter being arranged at a fluidic input of the measuring arrangement and being configured to filter out any particles whose sizes exceed a predefined size threshold. A filter thus arranged may advantageously avoid blockage of the main direction of flow by exceedingly large particles and may previously filter out any particles that are not of interest from the stream of fluid used for detection.

In an advantageous embodiment, the measuring arrangement includes a control element, said control element being arranged at a fluidic input or at a fluidic output and being configured to influence a flow volume of a fluid flowing through the measuring arrangement. For example, such control elements may be valves or flaps, e.g. micromechanical flaps or valves, etc., which may be employed for keeping the stream of fluid within desired limits. The control element may effect stabilization of the fluid flow, which is advantageous for detecting particles.

In an advantageous embodiment, the measuring arrangement is configured to control the control element on the basis of flow volume information provided by a flow volume meter so as to regulate a stream of fluid passing the surface of the electrostatic concentrator. Such regulation may advantageously be used for effecting stabilization of the flow of fluid, whereby sensing on the part of the imaging sensor is facilitated. In addition, said regulation, or limitation, of the velocity of flow may contribute to the fact that particles are directed toward the surface along a desired path and are able to come sufficiently close to the surface and/or to adhere to the surface if need be.

An embodiment in accordance with the invention provides a method of detecting particles. The method includes directing particles to be verified toward a surface through an electric field (e.g. by means of an electrostatic concentrator as described above). In addition, the method includes detecting the particles directed toward the surface while using imaging (e.g. while using an imaging sensor as described above). By applying the method described, low-cost, space-saving and efficient sensing of particles can be enabled.

BRIEF DESCRIPTION OF THE DRAWINGS

Embodiments of the present invention will be detailed subsequently referring to the appended drawings, in which.

DETAILED DESCRIPTION OF THE INVENTION

1. Embodiment in Accordance with FIG. 1

Figure 1:
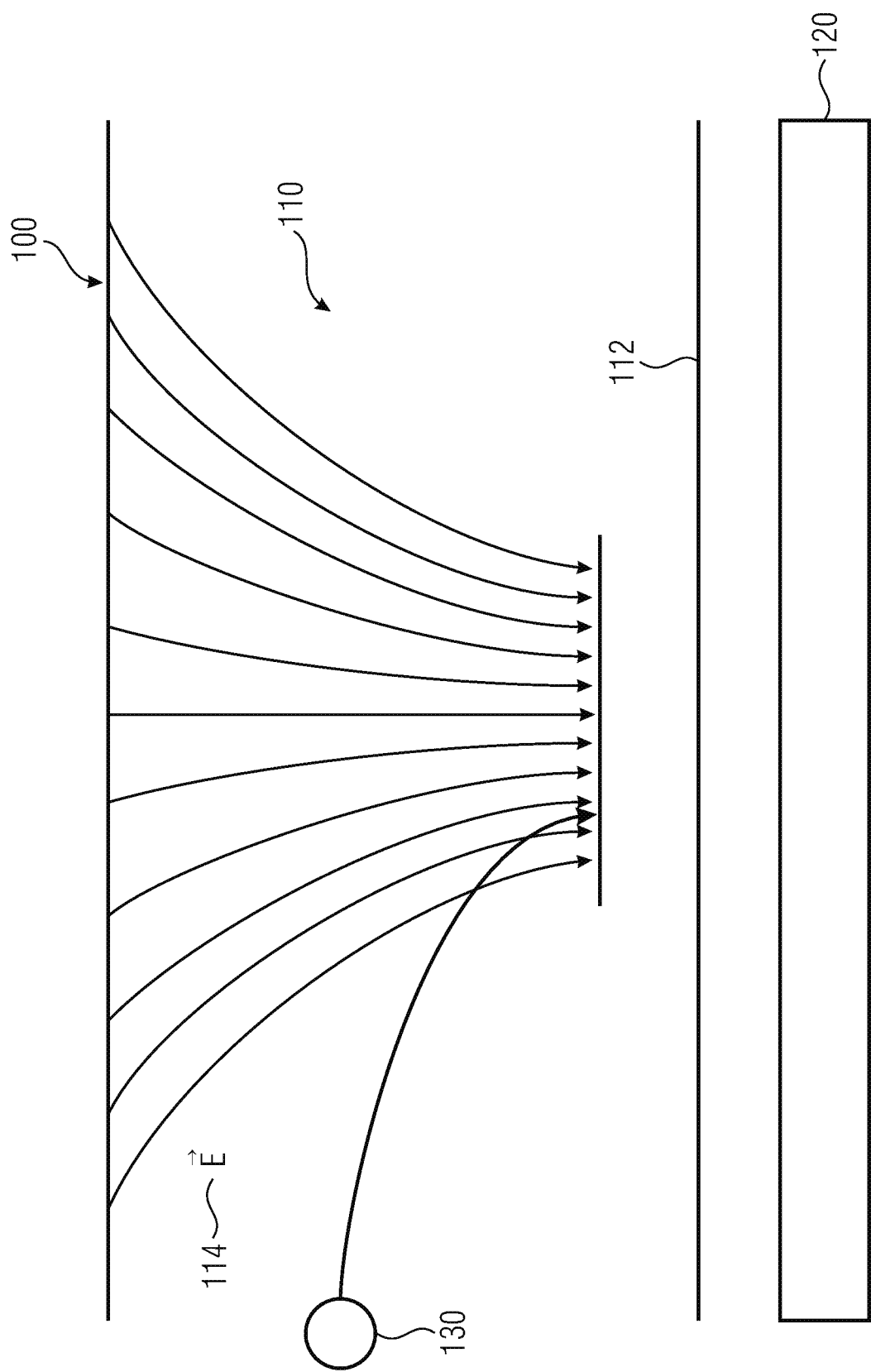
FIG. 1 shows a schematic representation of a measuring arrangement in accordance with an embodiment of the present invention.

FIG. 1 shows a schematic representation of a measuring arrangement in accordance with an embodiment of the present invention.

The measuring arrangement 100 includes an electrostatic concentrator 110. In addition, the measuring arrangement 100 includes a surface 112. In addition, the electrostatic concentrator 110 is configured to establish an inhomogeneous electric field 114. Moreover, the measuring arrangement 100 includes an imaging sensor 120. In the present example, a particle 130 is directed toward the surface 112 through the electric field 114. In this context it does not matter which polarity the electric field 114 exhibits. Particles 130 passing through the inhomogeneous electric field 114 are polarized and accelerated in the direction of a high field line density. In accordance with the known laws of electric engineering, polarization, i.e. the induced dipole moment, is square-dependent on the particle diameter. This results in that large particles 130 are directed clearly more strongly in the direction of a high field density. In the present example, the imaging sensor 120 is arranged below the surface 112. Such an arrangement is favorable in terms of imaging by means of cast shadows. Moreover, the imaging sensor 120 may also be arranged above the surface 112. Such an arrangement is favorable in terms of imaging by means of imaging optics.

In summary, it is therefore to be stated that through the electric field 114, directing of particles 130 toward an observable surface 112 is made possible. In addition, particles 130 which have been directed onto the surface 112 may be detected on the basis of image information of the imaging sensor 120.

The measuring arrangement 100 may optionally be extended by several or all of the structural features and/or functionalities which will be described in the following.

2. Embodiment in Accordance with FIG. 2

Figure 2:
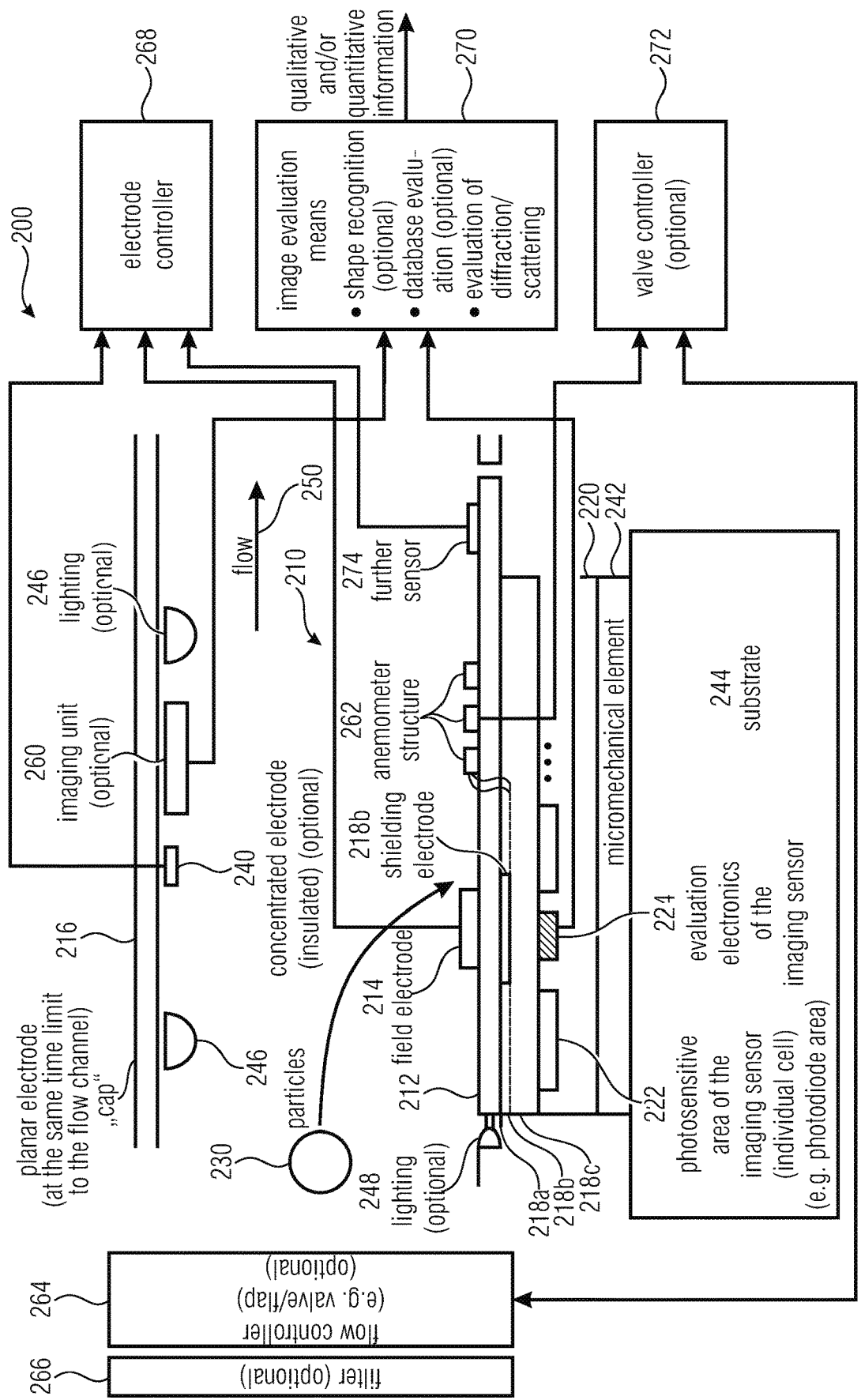
FIG. 2 shows a schematic representation of a measuring arrangement in accordance with an embodiment of the present invention.

FIG. 2 shows a schematic representation of a measuring arrangement, in accordance with an embodiment of the present invention.

The measuring arrangement 200 includes an electrostatic concentrator 210. The electrostatic concentrator includes a surface 212 toward which particles 230 are directed. In addition, the electrostatic concentrator 210 includes a field electrode 214 which serves to generate an inhomogeneous electric field, such as the field 114. In the present example, the field electrode 214 is arranged on the surface 212 of the electrostatic concentrator. Moreover, the electrostatic concentrator 210 in the present example includes a planar electrode 216 serving as a ground electrode for the inhomogeneous electric field. In addition, the planar electrode 216 may serve to confine the gas flow to be observed, e.g. by defining a flow channel.

In addition, the measuring arrangement 200 includes an imaging unit 220. The imaging unit 220 includes an imaging sensor having photosensitive areas 222, e.g. photodiodes. Moreover, the imaging sensor of the imaging unit 220 includes evaluation electronics 224. In the example at hand, the surface 212 of the electrostatic concentrator 210 is arranged in the direction of incident light of the imaging unit 220.

Moreover, the imaging unit 220 and the surface 212 of the electrostatic concentrator 210 have an insulating layer 218a, a transparent conducting layer 218b and a further insulating layer 218c arranged between them. Insertion of a transparent conducting layer 218b may prevent a disruptive breakdown of the electric field of the electrostatic concentrator from occurring in that the conducting layer 218b is grounded and thus acts as a shielding electrode. For reasons of simplified manufacturing, an extremely thin plate of glass, or, even better, quartz having a thickness of several 10 µm may be employed, for example, which on its lower side comprises a transparent conducting layer 218b whose potential is set to ground and which on its upper side comprises structured field electrodes 214. A geometrically equivalent, advantageous arrangement may provide for the surface 212 to be configured, by means of the processes established in semiconductor manufacturing, to have a transparent insulator (e.g. silicon dioxide, SiO2) which planarizes the surface 212 sufficiently, a grounded transparent conducting layer 218b (e.g. indium tin oxide, ITO), an insulating layer 218a having a thickness of approx. 1-2 µm (e.g. SiO2) and, subsequently, the lithographically structured field electrodes 214. The sequence of layers described here, including the imaging unit, may be utilized in this or in a modified form so as to enable manufacturing of large numbers by using standard components that are cheap and easily available, such as image sensors or LEDs in a batch manufacturing process, e.g. for ITO (indium tin oxide) on glass.

In addition, the dimension of a field electrode of the electrostatic concentrator 210 (e.g. in the main direction of flow 250) is smaller than a dimension of an individual cell of the imaging sensor of the imaging unit 220 (e.g. in the main direction of flow 250), whereby complete covering of the individual cell may be prevented.

Furthermore, concentrated electrodes 240 may be arranged above the surface 212 of the measuring arrangement 200, e.g. adjacently to the planar electrode 216. The concentrated electrodes 240 may be utilized for generating re-orientation of the electric field, with a field line density of the electric field which increases starting from the surface 212, and, thus, for enabling the surface 212 of the measuring arrangement 200 to be cleaned. Moreover, grounding of the field electrodes 214 is advantageous for the purpose of cleaning the surface 212. In combination with a flow 250, cleaning of the surface 212 may thus be effected. As can be seen in the present example, cleaning may also be effected by causing the surface 212, e.g. by means of ultrasound, to (e.g. intensely) mechanically vibrate at high frequencies by arranging a micromechanical element 242, e.g. a piezo film, in a mechanical connection to a substrate 244 on which the surface 212 is arranged (e.g, with several layers in between), and in a (e.g. indirect) mechanical connection to the surface 212.

In addition, lighting elements 246 such as OLEDs (organic light emitting diodes) or LEDs (light emitting diodes) may be arranged above the surface 212 of the measuring arrangement 200, so that their light is suitably guided to, or impinges on, the particles 230 to be detected. Such an arrangement of the lighting 246 also practically supports, e.g., imaging by means of cast shadows. By varying the color of the lighting 246, which may be effected on the fly, for example, or by using lighting having a broad spectrum of light, evaluation of diffraction images is possible as a function of the wavelength. A further advantageous approach to lighting, in particular when implementing a glass plate as the layer located underneath the surface 212, may consist in laterally coupling the light into said glass plate. This is depicted by lighting having the reference numeral 248. Such an arrangement enables areas which are occupied by particles (e.g. areas of the surface 212) to locally couple out the light (and, e.g., to scatter or reflect the light), so that consequently, the light locally coupled out may impinge on the imaging sensor.

Alternatively or additionally, optical detection may be effected by imaging optics. For this purpose, e.g. a further imaging unit 260 is arranged above the surface 212, e.g. adjacently to the planar electrode 216, said imaging optics also benefitting from lighting 246. Moreover, e.g. in order to improve the results of image recognition, the lighting units 246 and 248 may be configured such that neither too much nor too little light impinges on the imaging sensor.

For quantitative measurement, but also for the purpose of performing the function as determined, a flow of fluid passing the surface 212 should be known in some cases. For this purpose, a structure 262 may be provided, for example, which operates in accordance with the anemometric principle. Such fluid flow meters, or air flow meters, in their simplest well-tried form use three conductors and/or resistors; the central one is heated, the two lateral ones, which are arranged in the flow direction thereof, detect the drift of the temperature profile that is due to the flow. As is depicted by reference numeral 262 in FIG. 2, such a structure may be manufactured in a particularly advantageous manner on the surface 212 along with the field electrodes 214.

Furthermore, the measuring arrangement 200 may be equipped with one or more flow controllers 264, e.g. valves or flaps, which serve to keep the flow 250 within desired limits. Moreover, the measuring arrangement may include one of more filters 266 so that the gas flow passing the surface 212 contains only particles smaller than a desired size.

In addition, the measuring arrangement 200 includes, e.g., an electrode controller 268 so as to control the electrodes 214 and 240. Moreover, the measuring arrangement 200 includes, e.g., an image evaluation means 270 which performs image recognition by means of the image information of the imaging sensor 220 and/or 260. When using imaging by means of cast shadows, relatively large particles extend across many pixels. This knowledge may be exploited, for example, in order to distinguish particles according to their sizes. For example, allergens such as various types of pollen, asbestos fibers, parts of insects, mites are not only several 10 µm in size, but also vary individually. By means of a comparison with a corresponding database, at least rough association and identification of the particles directed onto the surface 212 may thus be performed. Relatively small particles whose dimensions are comparable to or smaller than the dimension of a pixel result, in the case of imaging on the basis of cast shadows, in shadowing of the occupied pixel. Thus, particles may be recognized and at least roughly classified in accordance with their respective size by means of known mechanisms of optical diffraction (e.g. Mie scattering) due to weakening of the light impinging on the occupied pixel, even if their dimensions are clearly below the wavelength. In other words, there may be an evaluation, for example, as to how strongly the light impinging on a pixel is weakened, and one may thus infer the size and/or type of the particle.

On top of that, the measuring arrangement 200 may include a valve controller 272. By sensing the fluid flow by means of the air flow meter structure 262, the fluid volume per time unit and, therefore, the particle concentration per volume may be indicated. The fluid flow may be kept within certain limits by means of fluid measures taken by the flow volume controller 264, for example by setting of valves or flaps, so as to give the particles time for impinging on or approaching the surface 212. The flow volume controller as well as filters may be located, e.g., at the fluidic input or at the fluidic output of the measuring arrangement together. The flow volume controller 264 may regulate the flow 250 by means of the valve controller 262 and feedback of the air flow information of the air flow meter 262, and may stabilize said flow 250 within tolerable limits.

In addition, the surface 212 may have further sensors 274 arranged thereon, such as e.g. a temperature sensor, a humidity sensor or a voltage sensor which may be used, e.g., for regulating the applied field strength of the field electrode 214 to be optimally close to the limit of breakdown. Alternatively or additionally, a high series resistor of, e.g., 20 MOhm may be used (e.g. between a voltage source and an electrode, e.g. the field electrode 214).

For example, a voltage drop across the series resistor may be detected. By means of the series resistor one may easily measure, e.g., when too much high voltage (HV) is present. In some embodiments it is useful to apply a short increase in voltage (e.g. across the electrodes and/or between a first electrode and a terminal of a series resistor connected upstream from a second electrode), as is done, e.g., in Geiger-Muller or other high-voltage setups. In some embodiments, the voltage, more specifically the field strength, even more specifically dE/dr, is taken into account in a square manner. A voltage impressed onto the field electrode 214 causes, e.g., a field strength E, the gradient dE/dr of which acts in a square manner with regard to the distance r from the sensor. Due to the progress made in MEMS technologies (MEMS=microelectromechanical system), the sensors 274 may ideally also be monolithically integrated into the measuring arrangement 200.

In summary, it is therefore to be stated that by arranging an electrostatic concentrator 210, an imaging unit 220 and further optional constituents such as an air flow meter structure 262, lighting 246, a planar electrode 216, which may serve to confine the flow channel at the same time, a concentrated electrode 240, a further imaging unit 260, a filter 266, a flow volume controller 264, e.g. valves or flaps, a micromechanical element 246, alternative lighting 248, a shielding electrode 218b or a valve controller 272 accordingly, efficient quantitative and qualitative analysis of a flow of fluid is possible.

3. Imaging Unit in Accordance with FIG. 3a

Figure 3A:
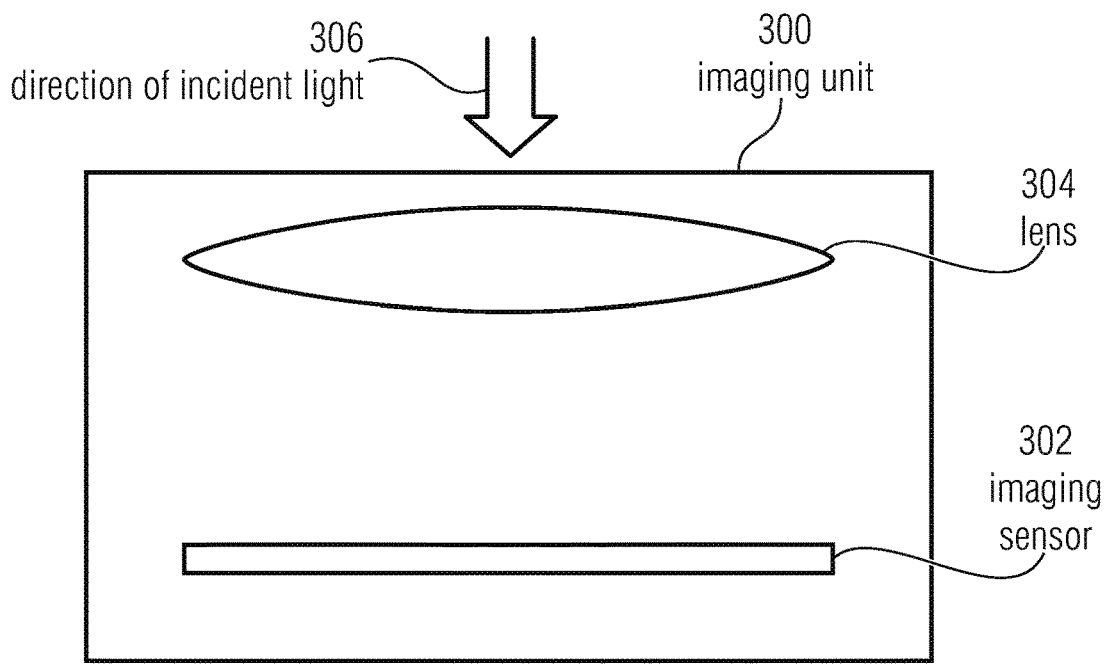
FIG. 3a shows a schematic representation of an imaging unit comprising refractive optics in accordance with an embodiment of the present invention.

FIG. 3a shows an embodiment of an imaging unit which may be used in a measuring arrangement in accordance with the present invention, e.g. in the measuring arrangement 100 or 200 of FIG. 1 or FIG. 2.

The imaging unit 300 of FIG. 3a corresponds to an embodiment of the imaging unit 220 or 260, and/or may replace the imaging sensor 120 in FIG. 1.

The imaging unit 300 includes an imaging sensor 302 as well as a lens 304. The lens is arranged in front of the imaging sensor 302 in the direction of incident light 306. Thus, the surface 212 may be imaged onto the imaging sensor 302 by means of a lens. The measuring arrangement may capture both a shadow image of the particles (e.g. when the particles are sensed between a lighting device and the imaging unit 300) and an actual image of the particles (e.g. when light impinges on the particles from that side on which the imaging unit, too, is located). For example, it is also possible for both a shadow image of the particles and an actual image of the particles to be captured, it being possible for the shadow image and the actual image to be used together in order to classify the particles. Moreover, magnification may be effected by means of the lens 304, which is advantageous for possible subsequent image recognition.

4. Imaging Unit in Accordance with FIG. 3b

Figure 3B:
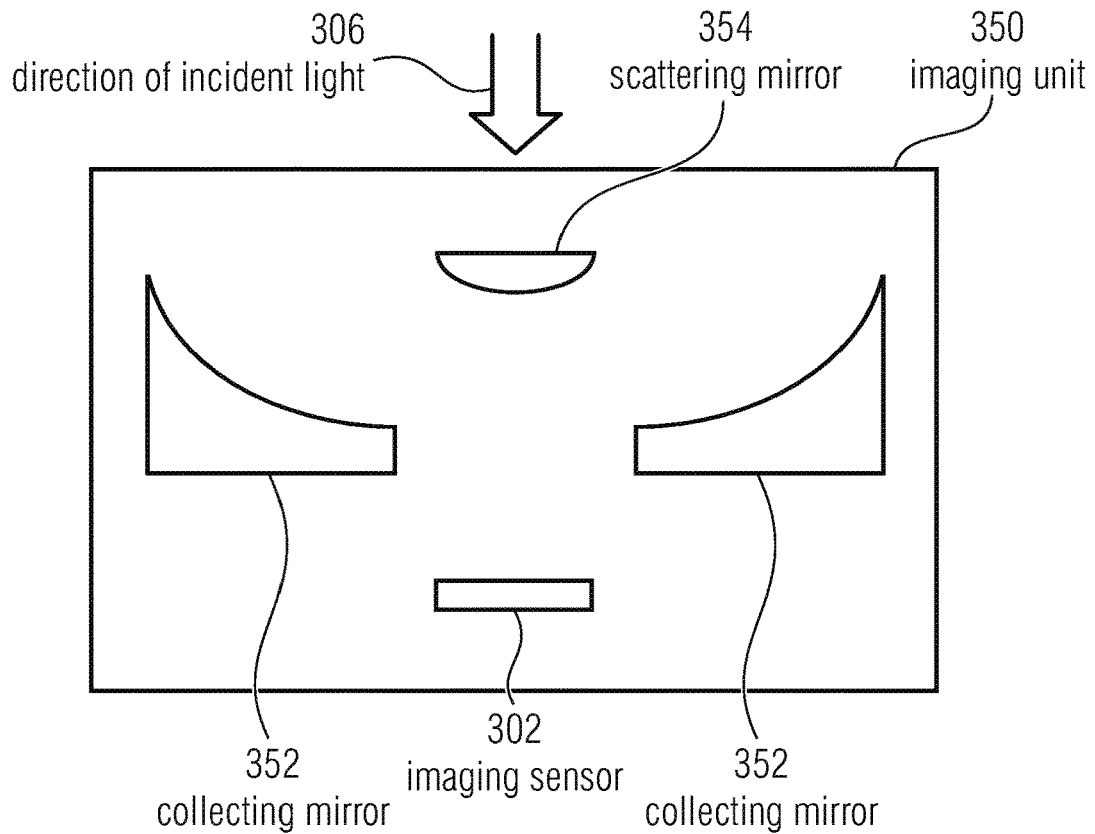
FIG. 3b shows a schematic representation of an imaging unit comprising mirror optics in accordance with an embodiment of the present invention.

FIG. 3b shows a schematic representation of an imaging unit 350 comprising mirror optics, in accordance with an embodiment of the present invention.

The imaging unit 350 of FIG. 3b corresponds to an embodiment of the imaging unit 220 or 260, and/or may replace the imaging sensor 120 in FIG. 1.

The imaging unit 350 includes an imaging sensor 302, a collecting mirror 352 and a scattering mirror 354. The mirrors 352 and 354 are arranged in front of the imaging sensor 302 in the direction of incident light 306. An implementation of the imaging unit 350 as shown in FIG. 3b may be useful in terms of enabling reduction of the structural size. For reducing the structural size, arranging the mirrors 352 and 354 in a manner that is derived from the Cassegrain principle is useful. The imaging unit 350 may replace imagining units 260 or 220, for example. What is advantageous about this implementation is potential magnification of the image, which may lead to an improvement in the results of any image recognition which may follow.

5. Field Electrode Arrangement of FIG. 4

Figure 4:
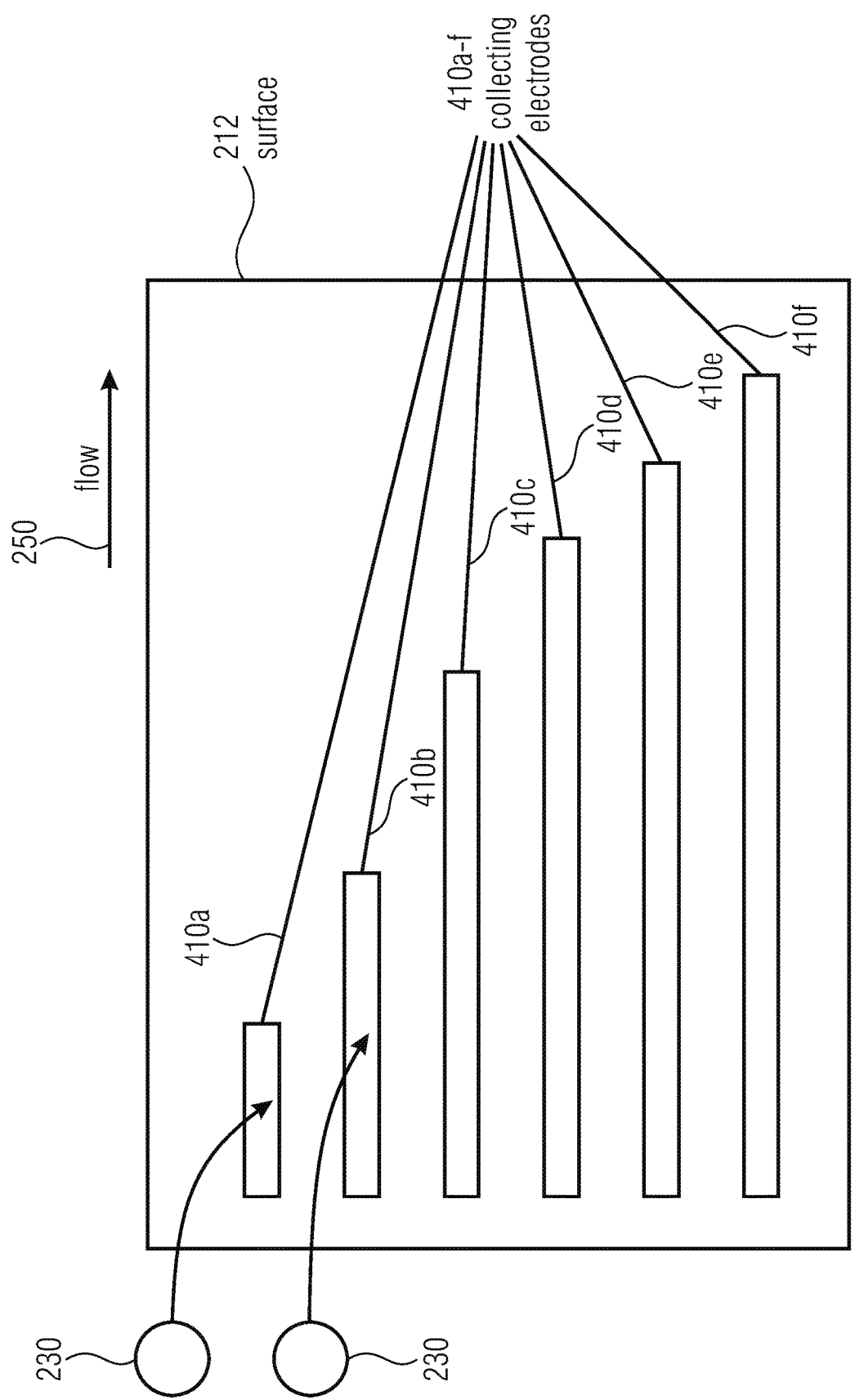
FIG. 4 shows a schematic representation of a surface having collecting electrodes of different lengths in accordance with an embodiment of the present invention.

FIG. 4 shows a schematic representation (top view) of an embodiment of the surface 112 or 212. It should be noted here that an implementation comprising several field electrodes is optional, or that one field electrode is sufficient for inventive application.

In the embodiment of FIG. 4 that is under consideration, several collecting electrodes 410a-f are depicted which (e.g. along with a planar electrode 216) generate an inhomogeneous electric field as field electrodes, by analogy with the field electrode 214, so as to direct particles 230 onto the surface 112 or 212. In this context, e.g., an extension of the second one of the collecting electrodes 410b in a main direction of flow 250 is larger than an extension of the first collecting electrode 410a in the main direction of flow 250. For example, the collecting electrodes 410a-f are essentially arranged in parallel, with varying dimensions along the main direction of flow 250. The polarization, which is due to electrostatic induction, of the particles contained within the flow is dependent on the induced dipole moment and, thus, eventually on the square of their dimensions. This results in that large particles are accelerated in the direction of the collecting electrodes 410a-f with a considerably increased force. Large particles on average cover a shorter distance prior to impinging on or approaching the surface 212. Thus, particles may be roughly distinguished by their particles sizes by means of the arrangement described in FIG. 4 having collecting electrodes 410a-f of different lengths.

6. Embodiment of FIG. 5a

Figure 5A:
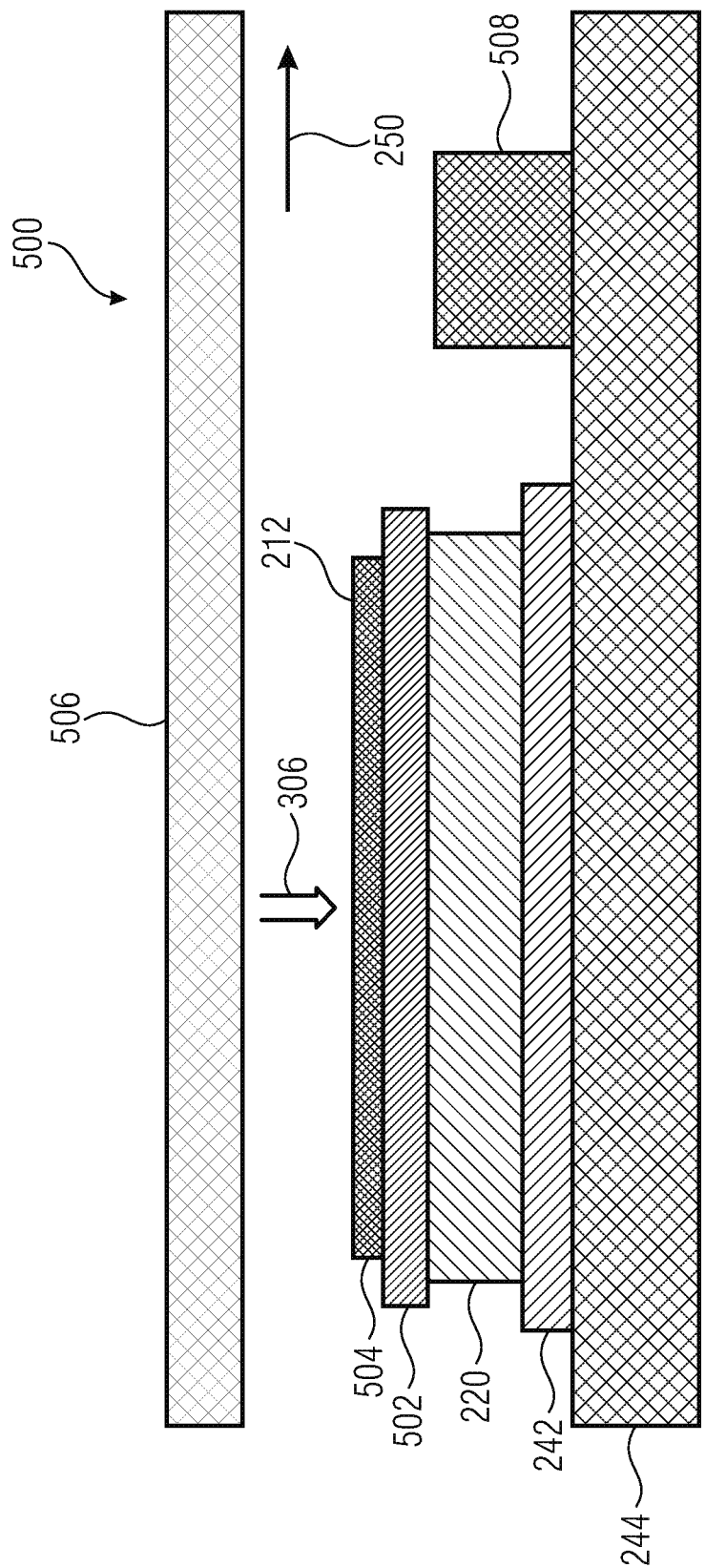
FIG. 5a shows a cross section alongside the direction of flow of a measuring arrangement in accordance with an embodiment of the present invention.

FIG. 5a shows a cross section along the direction of flow 250 of a measuring arrangement 500.

The measuring arrangement 500 comprises a substrate 244 which has a micromechanical element 242, e.g. a piezo film, arranged thereon. An imaging unit 220 is arranged on the micromechanical element 242. In addition, a transparent insulating layer 502, made of glass, for example, is arranged on the imaging unit 220. The surface of the insulating layer 502 has at least one electrode 504 implemented thereon as a strip arranged along the main direction of flow 250. The at least one electrode 504, e.g., has a width of approx. 1 μm or less in a direction perpendicular to the main direction of flow 250 and the direction of incident light 306 and may be brought to a sufficiently high electric potential. In the present example, the surface 212 is formed by the surface of the insulating layer 502 and the surface of the field electrodes 504 applied thereon.

The electrode 504 may be manufactured on the surface of the insulating layer 502 by means of the usual methods of semiconductor technology, i.e. deposition, lithographic structuring, etc. A further possibility is to lithographically apply the field electrode 504 onto the layer 502 by means of one or more metal sheets (e.g. aluminum having a width of approx. 1 μm). What is more advantageous are metal sheets consisting of a transparent conductor (e.g. ITO).

In addition, the measuring arrangement 500 includes a planar electrode 506 which is implemented as a covering cap and forms, together with the substrate 244, a channel through which a fluid may flow and within which the elements, or layers, 242, 220, 502 and 504 which have been previously described are arranged. The longitudinal dimension of the channel typically is 10 mm, and the cross-sectional area within the channel which is available to the fluid is typically 5 mm times 0.3 mm.

In the present example, the electrode 504 is typically set to a potential of 100 Volt. Thus, an electrostatic field is formed between the planar electrode 506 and the field electrode 504, which field amounts to about 3000 V/cm on the basis of geometry. For example, a mean field strength that is present between the field electrode 504 and the planar electrode 506 may amount to 3000 V/cm. Also as a result of geometry, this field is highly inhomogeneous (which may be intentional, for example), the highest field line density being present at the field electrode 504.

Particles which are transported through this inhomogeneous field along with the gas flow are polarized and accelerated in the direction of a high field line density. There, they will adhere irrespective of the polarity present. In accordance with the known laws of electronic engineering, polarization, i.e. the induced dipole moment, is square-dependent on the particle diameter; large particles are therefore accelerated clearly more strongly in the direction of a high field line density, i.e. in the direction of the field electrode 504, and are retained on said field electrode 504 or in close proximity thereof. Speaking in terms of physics, the particles conveyed through the device along with the air flow have an electrostatic force acting on them which is in balance, for example, with the viscous deceleration, for example in accordance with Stoke's law of friction. This results in that relatively large particles are accelerated more strongly toward the field electrode 504 (e.g. more strongly than small particles). In other words, the deflection is proportionally dependent on the square of the particle diameter, whereas the drift is linearly dependent on the particle diameter. This is true, e.g., for a laminar flow, i.e. (e.g. in reality) only in approximate terms. The dwell time (e.g. of the particles) within the channel of the device and, thus, the velocity of flow may be adapted to the acceleration force so as to operate the device in a practical manner. For example, by setting, or regulating, the velocity of flow, the dwell time of the particles within the channel may be set such that the particles come sufficiently close to the surface 212 (e.g. individually and/or in a distinguishable manner and/or with a sharpness sufficient for classification) so as to be optically sensed or to adhere to the surface 212. Said adaptation may be effected by means of a flow volume controller 264, a valve controller 272 as well as an air flow meter structure 262 described in FIG. 2. In the embodiment present here, the air flow meter structure 508, which is analogous to the structure bearing the reference numeral 262 in FIG. 2, is arranged on the substrate 244.

On account of the pixel sizes of typically 1.5 μm which may be technically implemented by now the measuring arrangement is capable of optically detecting particles having dimensions of this size and resting on the surface 212. Quantitative dust measurement thus is effected as follows, in accordance with an embodiment of the invention: a gas flow, pre-filtered to have a particle diameter of typically smaller than 100 μm, is maintained within a range of several cm/s. The electrostatic arrangement fixates at least subsets of the contained particles on the surface 212, downstream image recognition means count and/or identify said particles over a specific time period (e.g. several seconds) and calculate therefrom the particles contained within the volumetric flow (e.g. a particle concentration).

In specific periodic time intervals, the surface 212 may be cleaned. Cleaning need not result in complete removal of all particles; particle measurement may also be effected incrementally, an increase in a number of particles attached to the surface 212 being evaluated over a specific time period; for example, particles are classified which have been newly attached to the surface 212 since a beginning of an time period of analysis.

It can be stated, in summary, that the planar electrode 506 represents, in combination with the field electrode 504, an electrostatic concentrator, e.g. an electrostatic concentrator 110.

The function of the imaging sensor 120 is implemented by the layer 220, for example. Deflection of the particles is effected, e.g., toward the surface 212 of the insulating layer 502 and/or the field electrode 504.

7. Embodiment of FIG. 5b

Figure 5B:
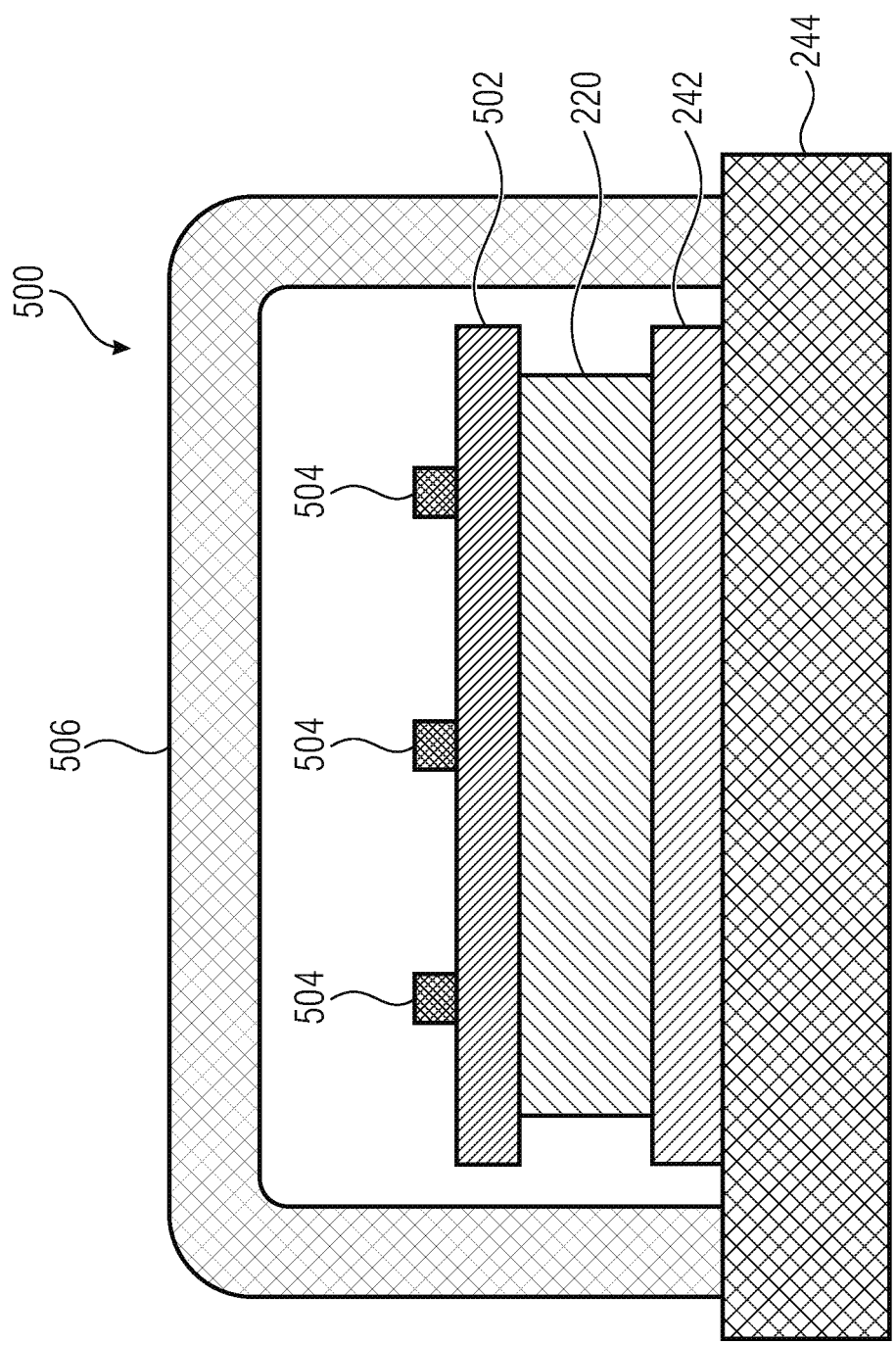
FIG. 5b shows a cross section in the direction of flow of a measuring arrangement in accordance with an embodiment of the present invention.

FIG. 5b shows a cross section perpendicular to the direction of flow of the measuring arrangement 500.

The micromechanical element 242, e.g. a piezo film, is arranged on the substrate 244. The micromechanical element 242, in turn, has the imaging unit 220 arranged thereon, which has the insulating transparent layer 502 arranged thereon. On the transparent insulating layer 502, the field electrodes 504 are implemented in parallel along the direction of flow and in the form of strips. The strips have, e.g., mutually equidistant spacings, the spacings between the field electrodes 504 being larger, e.g., than the distance from the planar electrode 506. The elements 242, 220, 502 and 504 are enclosed by the U-shaped planar electrode 506 and the substrate 244. Here, the planar electrode 506 forms, along with the substrate 244, a channel through which a fluid may flow. The layer stack 242, 220, 502 and 504 here essentially fills in a width of the flow channel, it being possible for a mean width of the layer stack to correspond, e.g., to at least 80% of a width of the flow channel, so that a large part of a stream flowing within the flow channel extends within an area located between the field electrodes 504 and a portion, located opposite the substrate 244, of the planar electrode 506.

8. Embodiment of FIG. 6

Figure 6:
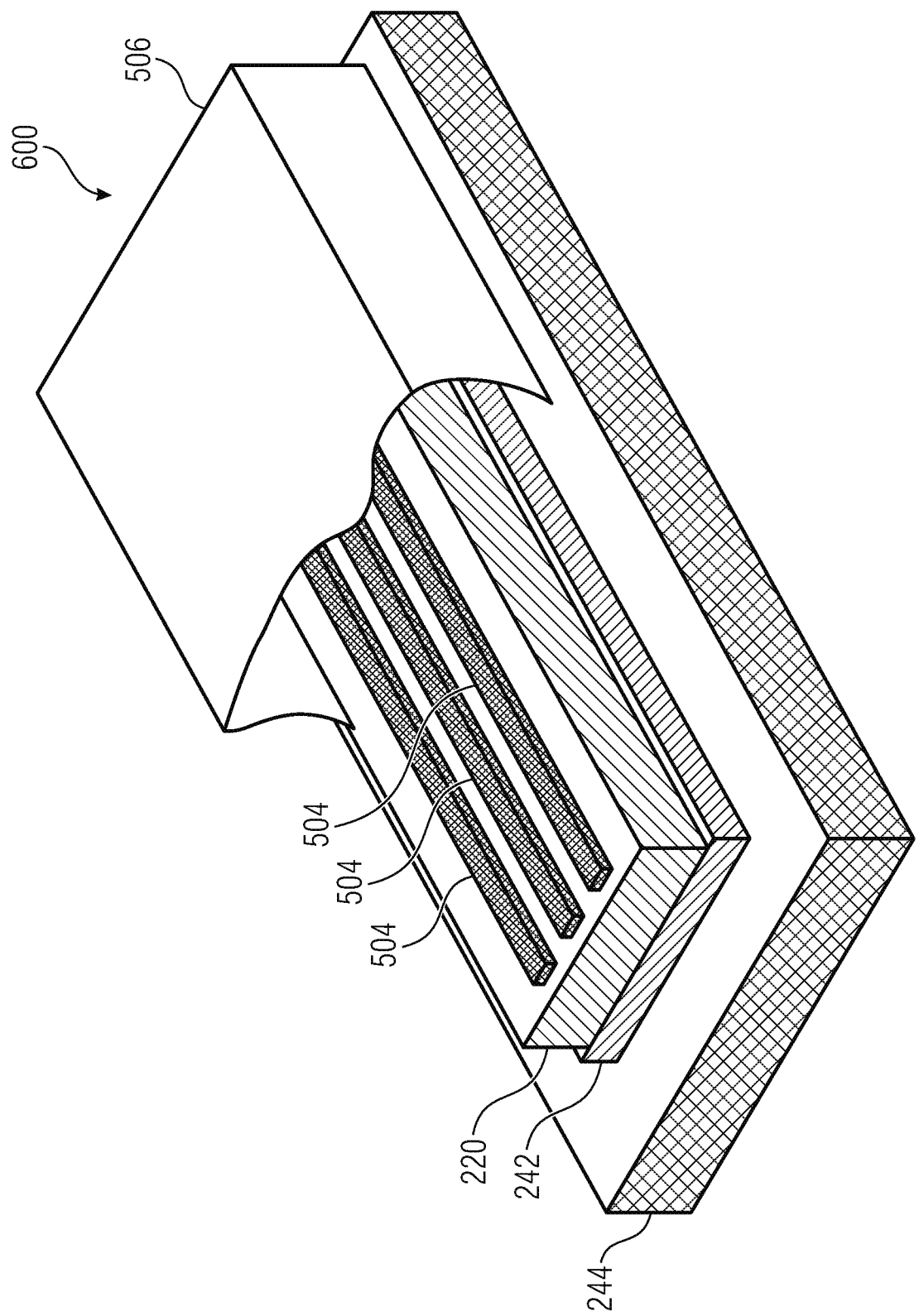
FIG. 6 shows a schematic representation of a measuring arrangement in a top view in accordance with an embodiment of the present invention.
Figure 7:
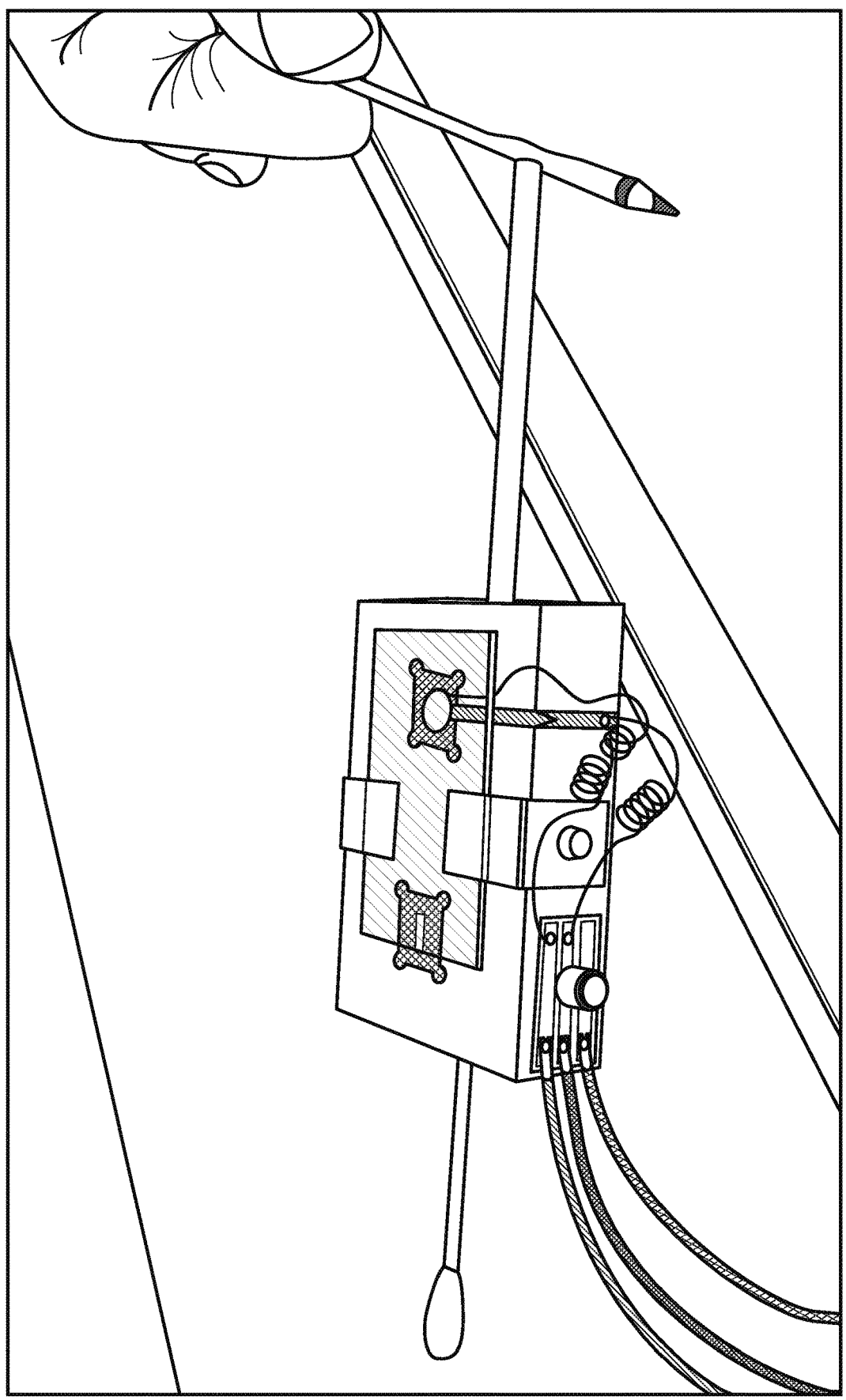
FIG. 7 shows an image of a measuring arrangement, in accordance with an embodiment of the invention.
Figure 8:
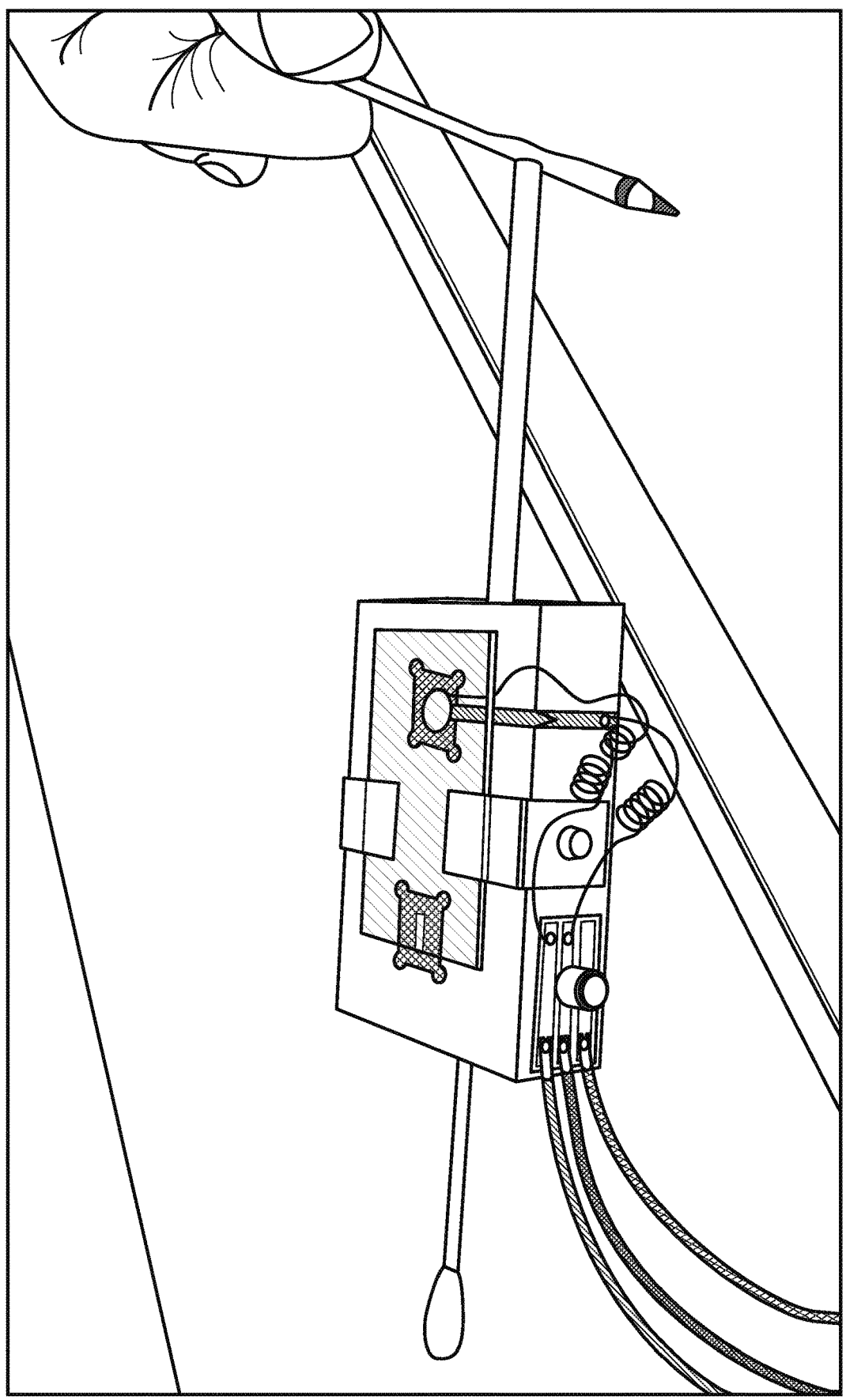
FIG. 8 shows an image of a measuring arrangement in accordance with an embodiment of the invention.

FIG. 6 shows a schematic representation of a measuring arrangement 600 in a top, or oblique, view.

By analogy with the measuring arrangements 500 and 200, the measuring arrangement 600 comprises the substrate 244. The substrate has the micromechanical element 242 arranged thereon, which in turn has the imaging unit 220 arranged thereon. In this embodiment, the field electrodes 504 are arranged, in a strip shape, directly on the imaging sensor 220. The elements 242, 220 and 504 are surrounded by a cap which in cross section has a U shape, for example, and acts as the planar electrode 506.

9. Further Aspects and Conclusions

Embodiments in accordance with the invention are based on the desire of enabling measurement of a concentration of fine dust (particulate matter) in gases. Some embodiments of the invention are based on the object of indicating and/or providing an optical sensor which may be produced essentially by means of MEMS technology and which, in particular, may also be integrated and be scaled toward small dimensions, said optical sensor above all also being capable of indicating qualitative conclusions as to the type of the relatively coarse dust particles.

Embodiments of the invention describe, or provide, fine-dust sensors for determining the dust content in ambient gases, in particular in ventilation systems and, generally, in devices for which it is appropriate to monitor the dust transported within the gas flowing through. The sensor uses an imaging sensor, typically a CMOS (complementary metal oxide semiconductor) image sensor having a surface of few $mm^2$. The sensitive surface has an electrode structure arranged thereon which acts as an electrostatic particle concentrator and temporarily concentrates the particles to be verified on the sensor. The image sensor may recognize coarse particles by means of their shapes, may classify them by using the methods of image recognition and may derive therefrom, in combination with evaluation electronics, a quantitative and qualitative result regarding dust pollution. What is optionally additionally contained is a miniaturized device for anemometrically measuring the gas flow and for controlling and generating it by means of micromechanical fluidic components which ideally are able to be integrated.

A possible, however not exclusive, approach illustrating the basic idea is depicted in cross section in FIG. 5a and in a front view in FIG. 5b.

A substrate 244 has a conductive covering cap 506 located thereon which forms, together with the substrate 244, a channel through which a fluid may flow. The longitudinal dimension of the channel typically is 10 mm, the cross-sectional area available to the gas is typically 5 mm times 0.3 mm. Further indications shall follow below with regard to scalability, i.e. to the possibility of further reduction in size.

The channel has an image sensor 220 arranged therein which is capable, due to the fact that the pixel size which has been reached in the meantime is typically 1.5 μm, of optically detecting particles having dimensions of this size and resting on the surface 212.

The surface of the image sensor has at least one electrode 504 of a width of approx. 1 μm or less arranged thereon which may be brought to a sufficiently high electric potential. In principle, this electrode may be manufactured on the surface of the image sensor by means of the common methods of semiconductor technology, i.e. deposition, lithographic structuring, etc.

If, in one embodiment of the invention, the electrode 504 is set to a potential of typically 100 V (e.g. with regard to a reference potential or ground potential equaling a potential of a planar electrode), an electrostatic field will be generated between the housing 506 (which forms the planar electrode, for example) and the electrode 504, said field resulting from geometry and amounting to approx. 3 kV/cm. Also for geometrical reasons, this field is highly inhomogeneous, the highest field line density being present at the electrode 504.

Particles which are transported through this inhomogeneous field along with the gas flow are polarized and accelerated in the direction of a high field line density. There, they will adhere irrespective of the polarity present. In accordance with the known laws of electronic engineering, polarization, i.e. the induced dipole moment, is square-dependent on the particle diameter; large particles are accelerated clearly more strongly in the direction of a high field line density, i.e. in the direction of the electrode, and are retained on said electrode or in close proximity thereof. Speaking in terms of physics, the particles conveyed through the device along with the air flow have an electrostatic force acting on them which is in balance with the viscous deceleration. This results in that relatively large particles are accelerated more strongly toward the electrode. The dwell time within the channel of the device and, thus, the velocity of flow may be adapted to the acceleration force so as to operate the device in a practical manner.

The image sensor may optically detect said particles and identify, or classify, them by means of image recognition, which is highly sophisticated by now. Relatively small particles whose dimensions are comparable to or smaller than the dimension of a pixel result in shadowing of the occupied pixel. Thus, particles may be recognized and at least roughly classified in accordance with their respective size by means of the mechanisms of optical diffraction (e.g. Mie scattering) due to weakening of the light impinging on the occupied pixel, even if their dimensions are clearly below the wavelength (e.g. the wavelength of the light source arranged within the measuring arrangement).

Relatively large particles extend across many pixels. For example, allergens such as various types of pollen, asbestos fibers, parts of insects, mites are not only several 10 μm in size, but also vary individually. By means of a comparison (e.g. of the images sensed by the imaging sensor) with a corresponding database (e.g. with the reference images, contained within the database, of various types of particles), at least rough association and identification of the dust deposited on and fixated on the image sensor may occur. Embodiments of the invention describe a new combination and utilization of an electrostatic concentrator on the or in close proximity to the image sensor.

One possibility is to lithographically apply the collecting electrode 504 by means of one or more metal sheets (e.g. metal strips) (for example, aluminum, tungsten, etc., having a width of approx. 1 μm, typically less than 5 μm, advantageously, but not necessarily, at least 0.5 μm) onto the covering layer of the image sensor. Even more advantageous are metal sheets made of a transparent conductor (for example indium tin oxide, ITO). Since this conductor may be at a comparatively high potential in order to perform the function as intended, there is the risk of a punch-through to the sensitive surface of the image sensor.

Said disruptive punch-through, or breakdown, may be prevented by inserting a further, e.g. transparent, conducting layer set to the (ground) potential of the housing. For reasons of simplified manufacturing, an extremely thin plate of glass, or, even better, quartz having a thickness of several 10 μm (for example, having a thickness of a maximum of 100 μm) may be employed which on its lower side comprises a ground plane (e.g. a transparent ground layer) and which on its upper side comprises structured electrodes (e.g. a field electrode).

A geometrically equivalent, advantageous arrangement may provide for the useful surface of the image sensor to be configured to have a transparent insulator (e.g. SiO2) which planarizes the surface sufficiently, a grounded transparent conducting layer 218b (e.g. ITO), an insulator having a thickness of approx. 1-2 μm (e.g. SiO2) and, subsequently, the lithographically structured electrodes 504.

For quantitative measurement, but also for the purpose of performing the function as determined, it is advantageous for the gas flow to be known. For this purpose, a measuring device is optionally provided which operates in accordance with the anemometric principle. Such or air flow meters in their simplest well-tried form use three conductors and/or resistors; the central one is heated, the two lateral ones, which are arranged in the flow direction thereof, detect the drift of the temperature profile that is due to the flow. Such an air flow meter 508 is indicated in FIG. 5a. Particularly advantageously, it may be arranged on the glass plate and be manufactured together with the electrodes 214 thereof, as is indicated by reference numeral 262 in FIG. 2.

By sensing the gas flow, the volume per time unit and, therefore, the concentration of particles per volume may be indicated, for example. The gas flow may be contained within certain limits by means of, e.g., fluid measures, valves, flaps, etc. so as to allow the particles time for impinging on the collecting electrode. Said fluidic components may be arranged, together with corresponding coarse filters (266), at the fluidic input or output of the dust measuring setup. In addition, provisions may be made for regulating the air flow in particular with feedback with the anemometer, and to stabilize it within tolerable limits.

In one embodiment of the invention, measurement of dust may be described as follows: a gas flow pre-filtered to comprise particles of a typical size of <100 μm is maintained within a range of several cm/s. The electrostatic arrangement fixates at least subsets of the contained particles on the image sensor, downstream image recognition means count and/or identify said particles over a specific time period (e.g. several seconds) and calculate the particles contained within the volumetric flow.

Optical detection may also occur by means of imaging optics. For example, the surface, which is occupied with particles, of the dust concentrator may be imaged onto the optical sensor by means of a lens. This may be effected both in a top view and in a transparent perspective view, and in particular in a combination of both optical paths. For reasons concerning the structural size it may be useful to employ methods of reducing the structural size, e.g. mirror optics derived from the Cassegrain principle.

In specific periodic time intervals, the surface may be cleaned. Said cleaning need not result in complete removal of all of the particles; particle measurement may also be effected incrementally.

Removal of the particles is effected, e.g., by switching off, or grounding, the voltage applied at the collecting electrode 504. In this case, those particles which are no longer electrostatically fixated are then "blown away" in the air flow. This may be supported by a geometric "polarity reversal" of the electrostatic field, to be more precise of its inhomogeneity, e.g. by arranging insulated narrow or point-shaped electrodes, which have a potential different from ground potential (at least for the time of detachment), e.g. on the inside of the housing, e.g. by arranging electrodes on the inside of the "lid" of the channel through which the fluid flows.

Said removal may also be supported, for example, in that the image sensor or at least the fixation electrode is caused, e.g. by means of ultrasound, to vibrate at high frequencies. For this purpose, e.g., a piezo film 242 arranged in a mechanical connection to the substrate 244 may be used.

The arrangement outlined here may optionally be improved in many regards. In particular, several collecting electrodes essentially arranged in parallel may be provided. As was illustrated above, the polarization, due to electrostatic induction, of the particles contained within the air flow is dependent on the dipole moment induced, and, thus, eventually on the square of their dimensions: large particles are accelerated toward the electrode 504 with a substantially higher force and thus impinge "further forward", on average, i.e. closer to the input of the flow. Thus, one may distinguish in accordance with the particle size by using electrodes of different lengths.

In addition, due to the progress made in MEMS technology, other sensors may also be integrated in this sensor, ideally also be monolithically integrated in the arrangement thereof. An example thereof is a temperature sensor, a humidity sensor and a voltage sensor, which regulates the applied field strength to be optimally close to the breakdown point. In principle, an air volume corrected in terms of enthalpy may be determined by means of sensors combined in this manner.

What is also useful is to arrange a light source supporting (proximity) imaging (imaging of cast shadows). For generating an image, be it as proximity imaging ("cast shadows" as was described at the outset) or as optical imaging, lighting may be provided. Expediently, one or more OLEDs or LEDs are used for this purpose, their light being suitably directed onto the particles to be detected. The color may be varied in the process so as to evaluate diffraction images by means of the wavelength-dependent effects. A further advantageous approach to lighting, in particular when implementing a glass plate as the fixating concentrator, may consist in laterally coupling the light into said glass plate. Areas occupied by particles locally couple out the light and result in a signal within the image sensor. In this manner, additional distinction may be achieved by changing the color and varying between the top view and the transparent perspective view.

Scaling of said principle is limited by the following parameters in some cases: on the one hand, the air volume flowing through should not fall below a certain minimum volume so as to carry along a sufficient amount of detectable particles within expedient periods of time. On the other hand, in some cases the velocity of flow (more specifically: the ratio between the air flow in cm/s to the overall length of the electrode) is not allowed to exceed a certain limit so as to allow those particles which are accelerated toward the electrode enough time to impinge.

An embodiment may comprise, in accordance with a rough estimation, a lower limit of approx. 5 mm to the overall dimension of such a sensor, at flow-through volumes of typically 0.3 $cm^3$/s. However, smaller embodiments are also feasible.

In addition, a measuring arrangement in accordance with an embodiment may include a fan of a size of 10 mm times 10 mm, a channel of the size of 8 mm times 12 mm times 0.6 mm, and an electrode at a glass cover plate, the glass cover plate being configured to enable observation by means of a microscope. Moreover, observation by means of an imaging sensor as was described above may be effected through the glass cover plate in addition to observation by means of a microscope. A measuring arrangement in accordance with an embodiment of the invention may include three feed lines, for example. A feed line for a fan having a voltage of e.g. 3.3 V, a further feed line for the field electrode, e.g. a collecting wire, having 780 V, as well as a further feed line for a reference potential, for example. An embodiment in accordance with the invention may include a fan generating, at the location of the fan, a pressure of e.g. 1 Pascal and a gas flow of e.g. 0.8 $cm^3$/s.

In the following, further aspects in accordance with embodiments of the invention will be described. Said aspects may be used individually or in combination.

In accordance with a first aspect, the invention provides a sensor device for determining the fine dust contained within gas flows, which consists of an electric field which directs the particles onto an optical sensor suitable for said particle detection, temporarily fixates said particles and subsequently recognizes them quantitatively and, within certain limits, also qualitatively.

In accordance with a second aspect while referring back to the first aspect, the invention provides a sensor arrangement for determining the fine dust contained within gas flows, characterized in that an image sensor, in particular a CMOS image sensor, is used in the process.

In accordance with a third aspect while referring back to the first and second aspects, the invention provides a sensor arrangement for determining the fine dust contained within gas flows, characterized in that close to and in front of the optically sensitive surface of the image sensor, at least one thin collecting electrode is located which is set to a sufficiently high electric potential and thus establishes a strong inhomogeneous electric field in relation to the surroundings, which are grounded, said field being suitable to accelerate dust particles toward said electrode and to retain them there.

In accordance with a fourth aspect while referring back to the first to third aspects, the invention provides a sensor arrangement for determining the fine dust contained within gas flows, characterized in that said electrode is located on a transparent substrate of its own which is arranged close to and in front of the optical image sensor.

In accordance with a fifth aspect while referring back to the first to third aspects, the invention provides a sensor arrangement for determining the fine dust contained within gas flows, characterized in that said electrode is located on a layer structure deposited directly on the surface of the image sensor, measures being implemented which are aimed at preventing the image sensor from being subject to electric influence.

In accordance with a sixth aspect while referring back to the first and second aspects, the invention provides a sensor arrangement for determining the fine dust contained within gas flows, characterized in that the dust concentrated by at least one fixation electrode is imaged onto the sensor face of an image sensor by means of lens optics.

In accordance with a seventh aspect while referring back to the first and second aspects, the invention provides a sensor arrangement for determining the fine dust contained within gas flows, characterized in that the dust concentrated by at least one fixation electrode is imaged onto the sensor face of an image sensor by means of mirror optics, in particular also by mirror optics reducing the structural size.

In accordance with an eighth aspect while referring back, mutatis mutandis, to all of the above aspects, the invention provides a sensor arrangement for determining the fine dust contained within gas flows, characterized in that the collecting electrode consists of metal, in particular of the metals established in semiconductor manufacturing (aluminum, tungsten, etc.).

In accordance with an ninth aspect while referring back, mutatis mutandis, to all of the above aspects, the invention provides a sensor arrangement for determining the fine dust contained within gas flows, characterized in that the collecting electrodes consist of a transparent conductor (e.g. indium tin oxide, ITO).

In accordance with a tenth aspect while referring back, mutatis mutandis, to all of the above aspects, the invention provides a sensor arrangement for determining the fine dust contained within gas flows, characterized in that along with the ambient light or also with a dedicated light source, proximity imaging (cast shadows) of the fixated particles on the image sensor is effected.

In accordance with an eleventh aspect while referring back, mutatis mutandis, to all of the above aspects, the invention provides a fine-dust sensor device characterized in that the image provided by the image sensor is evaluated by means of pattern recognition and by means of a count of particles which results in a measured quantity of the particles accumulating per time unit.

In accordance with a twelfth aspect while referring back, mutatis mutandis, to the first to eleventh aspects, the invention provides a fine-dust sensor device characterized in that large particles extending across many pixels of the image sensor are at least roughly identified and classified by means of pattern recognition.

In accordance with a thirteenth aspect while referring back to the twelfth aspect, the invention provides a fine-dust device characterized in that said identification and classification are performed by means of a data link to a database.

In accordance with a fourteenth aspect while referring back, mutatis mutandis, to all of the above aspects, the invention provides a fine-dust sensor device characterized in that at least one electric light source, LED; OLED having at least one and advantageously several emitted colors is employed for illuminating the imaging sensor.

In accordance with a fifteenth aspect while referring back, mutatis mutandis, to all of the above aspects, the invention provides a fine-dust sensor device characterized in that the gas flow has an electronic flow meter (anemometer in accordance with the temperature drift principle) arranged therein which is also placed, in particular, on the substrate supporting the collecting electrode in accordance with the fourth aspect or is placed on that layer which is defined in accordance with the fifth aspect and is integrated onto the surface.

In accordance with a sixteenth aspect while referring back to all of the above aspects, in particular the first to ninth aspects, the invention provides a fine-dust sensor device characterized in that a piezo element, which advantageously vibrates within the ultrasonic range, is provided for supporting periodic cleaning of the surface of the sensor device while being in a mechanical contact with the sensor device.

In accordance with a seventeenth aspect while referring back to all of the above aspects, the invention provides a fine-dust sensor device characterized in that feedback takes place between the anemometer measuring the gas flow and fluidic control devices.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A measuring arrangement comprising:
an electrostatic concentrator configured to direct particles to be verified toward a surface;
an imaging sensor configured to detect the particles directed onto the surface;
the electrostatic concentrator comprising a field electrode which is arranged in the surface or on the surface or adjacently to the surface and is configured to generate an inhomogeneous electrostatic field so as to direct the particles to be verified toward the surface; and
wherein a field electrode of the electrostatic concentrator is configured to comprise at least one electrode strip, a width of the at least one electrode strip being smaller than the largest extension of a photosensitive individual cell of the imaging sensor.

2. The measuring arrangement as claimed in claim 1, the measuring arrangement being configured such that temporary adhesion of the particles to the surface enables sensing of the adhered particles on the part of the imaging sensor.

3. The measuring arrangement as claimed in claim 1, wherein a layer, toward the surface of which the particles are directed, is part of the imaging sensor or is arranged adjacently to said imaging sensor, and
wherein the field electrode configured to generate an electrostatic field for deflecting the particles to be verified is arranged, in the direction of incident light, in front of the imaging sensor or on a surface of the imaging sensor.

4. The measuring arrangement as claimed in claim 1, wherein a field electrode of the electrostatic concentrator comprises a transparent electrode material.

5. The measuring arrangement as claimed in claim 1, wherein a counter electrode is arranged at a distance from the field electrode, so that an inhomogeneous electric field directing particles toward the surface may be generated within a flow channel extending between the counter electrode and the surface.

6. The measuring arrangement as claimed in claim 1, wherein the surface is arranged, in a direction of incident light, adjacently to an imaging sensor, and
the measuring arrangement being configured to detect cast shadows or a shadow image of particles directed toward the surface or adhering to the surface.

7. The measuring arrangement as claimed in claim 1, wherein the surface is arranged at a distance from an imaging sensor, an optical system comprising lens optics or mirror optics being arranged between the surface and the imaging sensor so as to image the particles directed toward the surface or the surface provided with adhered particles onto the imaging sensor.

8. The measuring arrangement as claimed in claim 1, the measuring arrangement being configured to generate a field strength of at least 30 kV/m in the surroundings of a field electrode of the electrostatic concentrator.

9. The measuring arrangement as claimed in claim 1, the measuring arrangement comprising several detection areas, a second one of the detection areas being configured to detect particles which have covered a larger distance through an electrostatic field generated by the electrostatic concentrator than particles detected by the first one of the detection areas.

10. The measuring arrangement as claimed in claim 1, the measuring arrangement being configured to temporarily switch off the field of the electrostatic concentrator so as to enable detachment of particles from the surface.

11. The measuring arrangement as claimed in claim 1, the measuring arrangement being configured to apply image recognition to the signal of the imaging sensor for qualitative determination of particles.

12. The measuring arrangement as claimed in claim 11, the measuring arrangement being configured to classify particles on the basis of the signal of the imaging sensor by means of a database.

13. The measuring arrangement as claimed in claim 11, the measuring arrangement being configured to classify particles on the basis of the signal of the imaging sensor by means of their shapes.

14. The measuring arrangement as claimed in claim 11, the measuring arrangement being configured to classify particles on the basis of the signal of the imaging sensor by means of their diffraction patterns or scattering patterns.

15. The measuring arrangement as claimed in claim 11, the measuring arrangement being configured to take into account, when classifying the particles, a wavelength dependence of image information sensed by the imaging sensor.

16. The measuring arrangement as claimed in claim 1, wherein an air flow meter is arranged to sense the velocity of the gas flow passing the surface of the electrostatic concentrator.

17. The measuring arrangement as claimed in claim 16, wherein the air flow meter is arranged on a surface along with a field electrode of the electrostatic concentrator.

18. The measuring arrangement as claimed in claim 1, the measuring arrangement comprising a filter,
wherein the filter is arranged at a fluidic input of the measuring arrangement and is configured to filter out any particles whose sizes exceed a predefined size threshold.

19. The measuring arrangement as claimed in claim 1, the measuring arrangement comprising a control element,
wherein the control element is arranged at a fluidic input or at a fluidic output of the measuring arrangement and is configured to influence a flow volume of a fluid flowing through the measuring arrangement.

20. The measuring arrangement as claimed in claim 19, the measuring arrangement being configured to control the control element on the basis of flow volume information provided by a flow volume meter so as to regulate a flow of fluid passing the surface of the electrostatic concentrator.

21. A measuring arrangement
comprising:
an electrostatic concentrator configured to direct particles to be verified toward a surface;
an imaging sensor configured to detect the particles directed onto the surface;
the electrostatic concentrator comprising a field electrode which is arranged in the surface or on the surface or adjacently to the surface and is configured to generate an inhomogeneous electrostatic field so as to direct the particles to be verified toward the surface;
wherein the surface toward which the particles are directed is separated from the imaging sensor by one or more transparent layers; and
the measuring arrangement comprising a shielding electrode configured to at least partly shield an electric field of the electrostatic concentrator off from the imaging electronics of the imaging sensor.

22. A measuring arrangement
comprising:
an electrostatic concentrator configured to direct particles to be verified toward a surface;
an imaging sensor configured to detect the particles directed onto the surface;
the electrostatic concentrator comprising a field electrode which is arranged in the surface or on the surface or adjacently to the surface and is configured to generate an inhomogeneous electrostatic field so as to direct the particles to be verified toward the surface:
the measuring arrangement comprising several detection areas, a second one of the detection areas being configured to detect particles which have covered a larger distance through an electrostatic field generated by the electrostatic concentrator than particles detected by the first one of the detection areas;
wherein the first detection area has a first electrode of the electrostatic concentrator associated with it which is configured to direct particles toward the first detection area,
wherein the second detection area has a second electrode of the electrostatic concentrator associated with it which is configured to direct particles toward the second detection area,
wherein an extension of the second electrode in a main direction of flow of the particles is larger than an extension of the first electrode in the main direction of flow of the particles.

23. A measuring arrangement
comprising:
an electrostatic concentrator configured to direct particles to be verified toward a surface;
an imaging sensor configured to detect the particles directed onto the surface;
the electrostatic concentrator comprising a field electrode which is arranged in the surface or on the surface or adjacently to the surface and is configured to generate an inhomogeneous electrostatic field so as to direct the particles to be verified toward the surface; and
the measuring arrangement comprising a micromechanical element configured to enable detachment of particles adhering to the surface.

24. A measuring arrangement
comprising:
an electrostatic concentrator configured to direct particles to be verified toward a surface;
an imaging sensor configured to detect the particles directed onto the surface;
the electrostatic concentrator comprising a field electrode which is arranged in the surface or on the surface or adjacently to the surface and is configured to generate an inhomogeneous electrostatic field so as to direct the particles to be verified toward the surface; and
the measuring arrangement being configured to temporarily generate an inhomogeneous electrostatic field whose field strength increases starting from the surface and which is configured to move particles away from the surface.

25. A method of detecting particles, comprising;
directing particles to be verified toward a surface on the part of an electrostatic concentrator;
detecting the particles directed onto the surface on the part of an imaging sensor;
the electrostatic concentrator comprising a field electrode which is arranged in the surface or on the surface or adjacently to the surface, and generates an inhomogeneous electrostatic field so as to direct the particles to be verified toward the surface; and
the method comprises temporarily generating an inhomogeneous electrostatic field whose field strength increases starting from the surface and which is configured to move particles away from the surface.

* * * * *